(12) United States Patent
Mullin

(10) Patent No.: US 12,227,958 B2
(45) Date of Patent: Feb. 18, 2025

(54) GRASS GUARD FOR FENCING

(71) Applicant: Kevin Mullin, Wexford, PA (US)

(72) Inventor: Kevin Mullin, Wexford, PA (US)

( * ) Notice: Subject to any disclaimer, the term of this patent is extended or adjusted under 35 U.S.C. 154(b) by 129 days.

(21) Appl. No.: 17/872,709

(22) Filed: Jul. 25, 2022

(65) Prior Publication Data

US 2023/0026173 A1 Jan. 26, 2023

Related U.S. Application Data

(60) Provisional application No. 63/225,724, filed on Jul. 26, 2021.

(51) Int. Cl.
*E04H 17/06* (2006.01)

(52) U.S. Cl.
CPC .................. *E04H 17/063* (2013.01)

(58) Field of Classification Search
CPC .... A01G 9/28; A01G 13/0256; A01K 15/006; A01K 15/04; A01M 21/00; E01F 15/0469; E04H 17/063; E06B 2009/002; E06B 3/88
USPC ............... 256/1, 32; 52/102; D25/38.1, 164; 160/371
See application file for complete search history.

(56) References Cited

U.S. PATENT DOCUMENTS

| | | | |
|---|---|---|---|
| 4,399,863 A | 8/1983 | Banasiuk | |
| 4,903,947 A * | 2/1990 | Groves | A01G 9/28 256/32 |
| 4,907,783 A * | 3/1990 | Fisk | E04H 17/06 47/33 |
| 4,964,619 A * | 10/1990 | Glidden, Jr. | E04H 17/063 47/33 |
| 5,568,994 A * | 10/1996 | Dawson | A01G 9/28 47/33 |
| 6,505,819 B1 * | 1/2003 | Damon | E04H 17/063 256/32 |
| 6,561,491 B2 | 5/2003 | Thompson et al. | |
| 6,837,487 B1 * | 1/2005 | Oden | E04H 17/063 256/19 |
| 7,628,385 B2 | 12/2009 | Laird | |
| 10,856,472 B1 | 12/2020 | Brown et al. | |
| 2005/0279981 A1 | 12/2005 | Onbey | |
| 2006/0266989 A1 | 11/2006 | Masterson | |
| 2008/0230757 A1 | 9/2008 | Brush | |
| 2009/0272954 A1 | 11/2009 | Laird | |
| 2011/0240939 A1 | 10/2011 | Justice | |

FOREIGN PATENT DOCUMENTS

CA 2638587 C 5/2011

* cited by examiner

*Primary Examiner* — Michael P Ferguson
*Assistant Examiner* — Zachary A Hall
(74) *Attorney, Agent, or Firm* — The Webb Law Firm

(57) ABSTRACT

A fence guard including: an elongated channel-shaped body member having a planar and horizontal bottom, at least two planer sidewalls extending upwardly from edges of the horizontal bottom and forming an open top, where an open longitudinal channel is defined by the horizontal bottom and the planar sidewalls; the planar sidewalls are outwardly angled in a direction extending from the horizontal bottom to the open top; and a plurality of longitudinally spaced openings along the planar sidewalls aligned respective of one another and formed to engage with each other via a connection member; where the connection member secures the planar sidewalls to one another.

17 Claims, 7 Drawing Sheets

GRASS GUARD FOR FENCING

CROSS REFERENCE TO RELATED APPLICATIONS

This application claims the benefit of U.S. Provisional Patent Application No. 63/225,724 filed on Jul. 26, 2021 and U.S. Provisional Patent Application No. 63/226,031 filed on Jul. 27, 2021, the disclosures of which are hereby incorporated by reference in their entireties.

BACKGROUND OF THE INVENTION

Field of the Invention

The present disclosure relates generally to fence guards, and more particularly, relating to a fence edge guard that is positionable along the bottom edge of a fence as a barrier to vegetation from growing through the openings of the fences and to prevent damage and excess wear on the cutting line of vegetation line trimmers and the fence.

Description of Related Art

Fences are quite frequently used to surround yard areas to either prevent access into the areas or to prevent access outside the areas, as they are long lasting and visually appealing. However, ever since their first use, a problem with vegetation growing through the open spaces along the bottom edge or up to the bottom edge of the fence has existed. This is a problem because the chemicals in the vegetation can cause the fence to corrode more quickly, thick vegetation growth traps and retains water resulting in the corrosion, and the growth of the vegetation through the fence is widely recognized as being visually unpleasant.

With the introduction of the modern day line trimmer or "weed wackers", wherein a spinning nylon, metal or plastic cutting line or string is used as a cutting blade to quickly and efficiently trim back vegetation growth, vegetation can somewhat be easily cut down and removed from the bottom of the fence. However, the bottom of the fence quickly wears away at the cutting line resulting in excess wear and consumption, which is undesirable. Further, the cutting line may damage the fence.

Edge guards for attachment to or for placement along the bottom edge of a fence to serve as vegetation barriers and/or guards to prevent damage and excess wear on the cutting line of line trimmers and fences are known. Various devices have been devised in the past to accomplish the above. These prior devices usually include a generally U-shaped channel that is positionable along the bottom edge of the fence with the bottom edge located between sidewalls of the channel to serve as vegetation barrier. Alternatively, they usually include a horizontal surface that spreads out on both sides of the bottom of the fence and thus prevents the growth of vegetation along spaced distances from the bottom of the fence. Such prior devices are usually difficult to install and require tools or even specialized tools to install. Also, frequently these devices are expensive and labor intensive during installation as fences vary in size and length. Additionally, these prior devices do not provide for a gap between the bottom of the device and the ground surface permitting trimming of vegetation between the bottom of the fence and the ground.

Accordingly, there is a need for an improved fence edge guard for providing a barrier against vegetation growth, and a guard against excess wear and consumption of the cutting line of a line trimmer that is easily installed, and provides a gap between the bottom of the fence and the ground surface.

SUMMARY OF THE INVENTION

It is an object of the present invention to provide a fence guard comprising an elongated channel-shaped body member having a planar and horizontal bottom, at least two planar sidewalls extending upwardly from edges of the horizontal bottom and forming an open top, wherein an open longitudinal channel is defined by the horizontal bottom and the planar sidewalls; the planar sidewalls are outwardly angled in a direction extending from the horizontal bottom to the open top; and a plurality of longitudinally spaced openings along the planar sidewalls aligned respective of one another and formed to engage with each other via a connection member; wherein the connection member secures the planar sidewalls to one another.

It is another object of the present invention to provide that the elongated channel-shaped body member is a flexible material.

It is another object of the present invention to provide that the body is configured to prevent damage to a cutting line of a line trimmer and to prevent vegetation from growing up through the spaces of a fence.

It is another object of the present invention to provide that the planar sidewalls are made of a plastic material.

It is another object of the present invention to provide that the body member is at least 2 inches in length and the planar sidewalls are at least 5 inches in length.

It is another object of the present invention to provide that the body is coupled to the planar sidewalls with an adhesive.

It is another object of the present invention to provide that the planar sidewalls are made of a water proof material.

It is another object of the present invention to provide that the planar sidewalls are sloped to allow for water to run off and the body is made of a water permissible material to allow for water to drain.

It is another object of the present invention to provide that the body and planar sidewalls are made of a material that allows for bending around a fence post.

It is another object of the present invention to provide that the body further comprises an aperture for inserting a fence post and the planar sidewalls wrap around the post.

It is another object of the present invention to provide that the plurality of spaced openings along the planar sidewalls are arranged diagonally.

It is another object of the present invention to provide that a fence guard system comprising: a fence guard comprising an elongated channel-shaped body member having a water permeable and horizontal bottom, at least two planar and upstanding sidewalls extending upwardly from edges of the horizontal bottom and forming an open top, wherein an open longitudinal channel is defined by the horizontal bottom and the planar sidewalls; the planar sidewalls are outwardly angled in a direction from the horizontal bottom to the open top; a cutting device to cut the body and sides; a hole forming device for forming holes through the sides; a connection member for connecting the sides, and a fence having fence posts and spaces, wherein the connection member connects the planar sidewalls to one another through the spaces of the fence.

It is another object of the present invention to provide that the elongated channel-shaped body member is a flexible material that is cut to the desired length with the cutting device.

It is another object of the present invention to provide that the body is formed around the fence to prevent damage to a cutting line of a line trimmer and to prevent vegetation from growing up through the spaces of the fence.

It is another object of the present invention to provide that the planar sidewalls are made of a plastic material and the fence is visible while the sides are secured.

It is another object of the present invention to provide that the body is at least the length of the horizontal bottom of the fence and the planar sidewalls are at least 5 inches in length.

It is another object of the present invention to provide that the planar sidewalls are sloped to allow for water to run off and the body is made of a water permissible material to allow for water to drain.

It is another object of the present invention to provide that the body further comprises an aperture for inserting the fence post and the sides wrap around the post.

It is another object of the present invention to provide a fence guard comprising: an elongated channel-shaped body member having a concave and water permeable bottom, at least two planar and upstanding sidewalls extending upwardly from edges of the body and forming an open top coupled to the body, wherein an open longitudinal channel is defined by the bottom and the planar sidewalls; the sidewalls are made of a clear, waterproof material and outwardly angled in a direction from the bottom to the open top; and a plurality of longitudinally spaced openings along the planar sidewalls aligned respective of one another and formed to engage with each other via a connection member to couple the planar sidewalls; wherein the connection member secures the planar sidewalls against a fence.

It is another object of the present invention to provide that the plurality of longitudinally spaced openings along the planar sidewalls are aligned diagonally and respective of one another and formed to engage with each other via a connection member to couple the planar sidewalls at differing heights.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DESCRIPTION OF THE INVENTION

Figure 1:
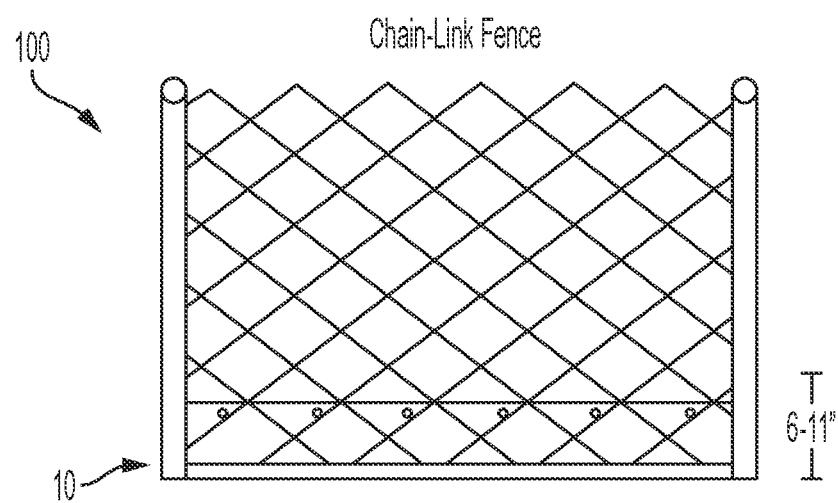
FIG. 1 displays a front view of a chain-linked fence with the fence guard installed.
Figure 2:
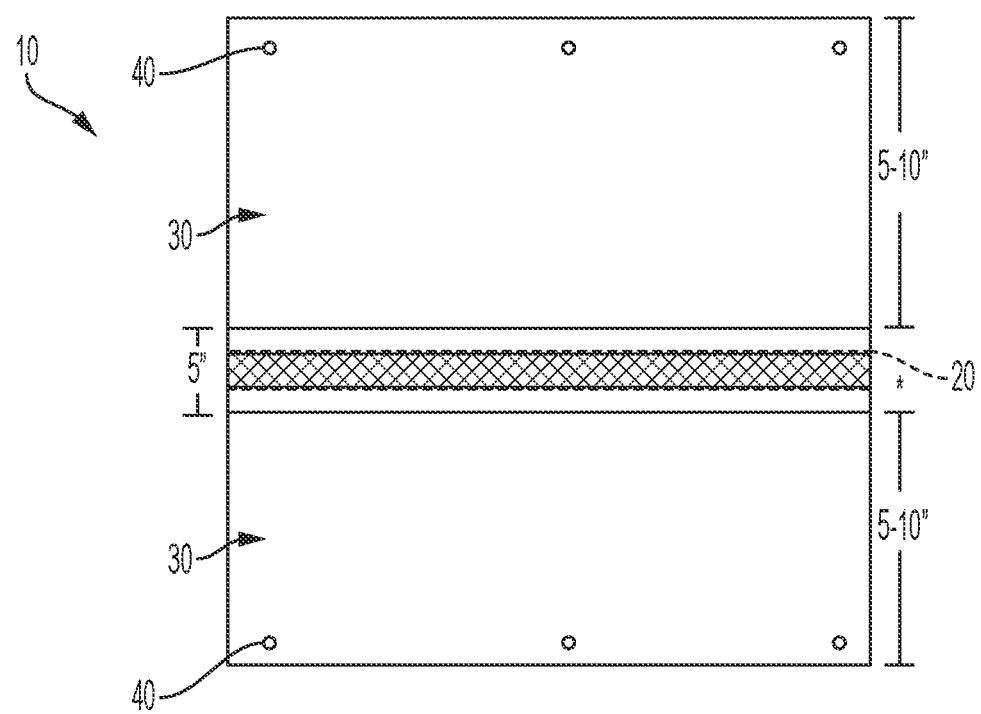
FIG. 2 displays a top down view of the fence guard laid out before installation
Figure 3:
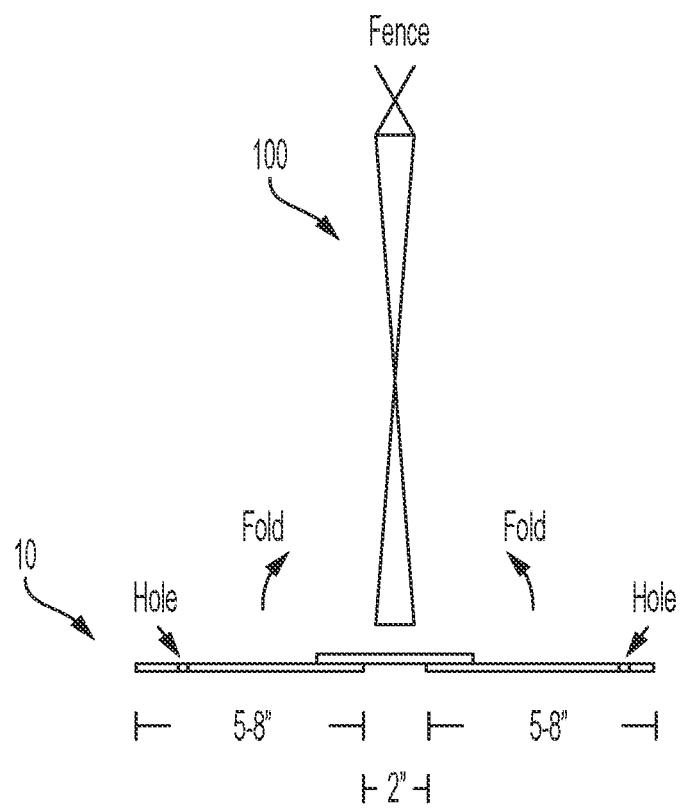
FIG. 3 displays a side cutout view of the fence guard laid out before installation under the fence.
Figure 4:
FIG. 4 displays a side cutout view of the fence guard placed upright with a connection means before installation under the fence.
Figure 5:
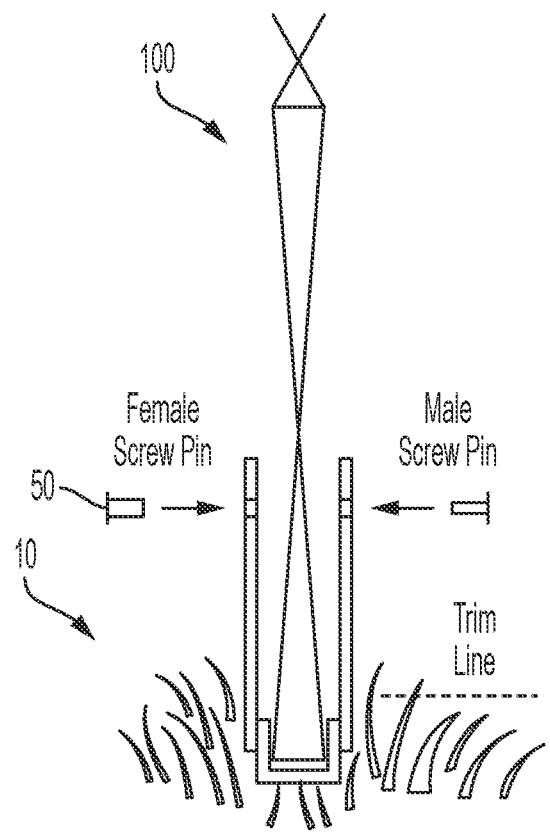
FIG. 5 displays a front view of the fence guard.
Figure 6:
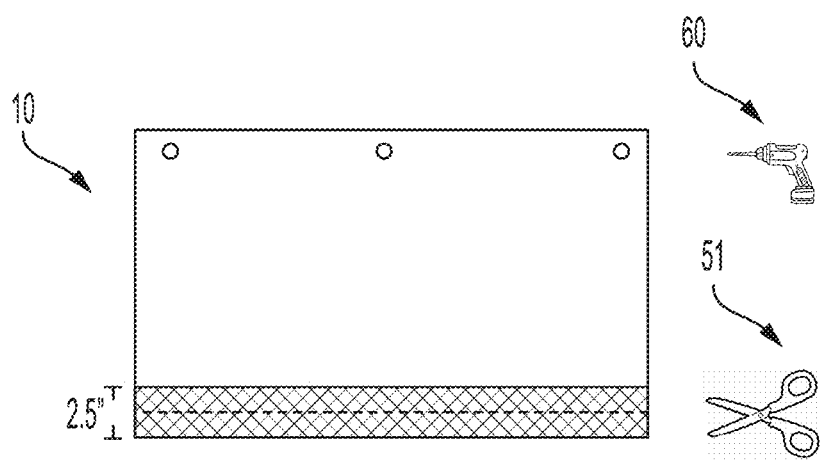
FIG. 6 displays a bottom view of the fence guard.
Figure 7:
FIG. 7 displays a bottom view of the fence guard.
Figure 8:
FIG. 8 displays an additional bottom view of the fence guard.
Figure 9:
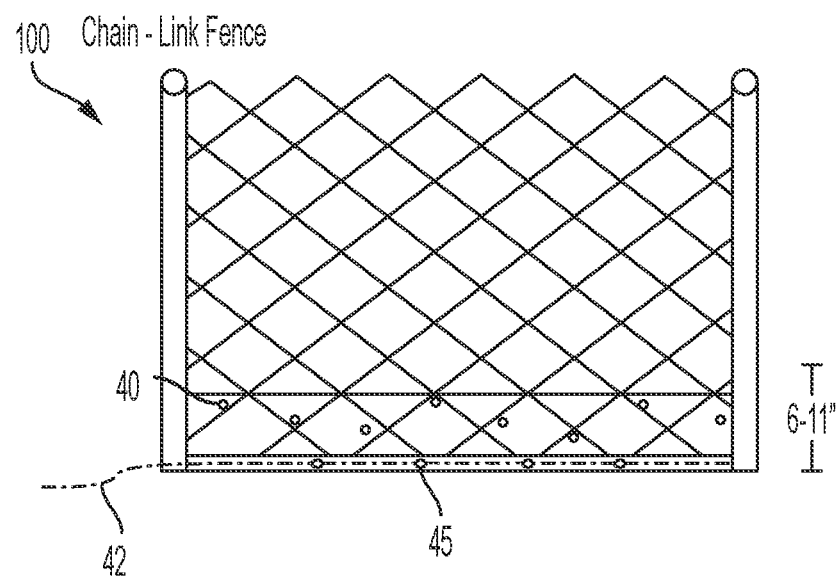
FIG. 9 displays a front view of a chain-linked fence with an alternative embodiment of the fence guard installed.

FIG. 1 displays a fence edge guard 10 for preventing vegetation from growing up through the openings of a fence 100 and for preventing damage and excess use of cutting line of a line trimmer. Specifically the fence edge guard 10 is shown coupled to the bottom edge of a fence 100. The fence edge guard 10 may be coupled to any fence type including but not limited to chain link, lattice, post, wood, and metal. Fences 100 are appropriately spaced a few inches from the ground surface level to prevent erosion of the fence 100 and ground due to exposure to water. The fence edge guard 10 extends horizontally along the bottom edge of the fence 100 and extends upwards preferably four inches, but may be between two to twelve inches to cover the bottom portion of the fence 100. This prevents vegetation from growing through the openings of the fence 100 at the areas covered by the fence edge guard 10. The fence edge guard 10 further provides a smooth surface against which the cutting line of a line trimmer can contact without causing wear or damage to the cutting line.

In FIGS. 1-9, the fence guard 10 includes a channel-shaped body member having a planar-shaped and horizontal bottom 20 with upstanding sidewalls 30 extending upwardly from the edges of the bottom 20 and form an open top. The bottom 20 may be concave and shaped to form around a fence bottom and be one to six inches. The sidewalls 30 are outwardly angled in a direction from the bottom 20 to the open top such that the sidewalls 30 and bottom 20 form a V or U shaped cross-section. One sidewall 30 may be shorter or taller than the other side 30 to ease the user in installing the fence guard 10. The sidewalls 30 have a plurality of longitudinally spaced openings 40 aligned respective of one another. The openings 40 are formed to engage with each other via a connection means and to secure the fence guard 10 to the fence bottom.

The plurality of spaced openings along the sidewall 30 may be arranged diagonally. The openings 40 being arranged diagonally advantageously allows for multiple connection points for coupling the two sides 30 at different heights and locations. This secures the two sides 30 together through an opening of the fence 100. The connection means 50 which couples the two sides 30 through the section of the fence 100 may include, but are not limited to, pins, hooks, bolts, screws, or any similar connector. In a preferred embodiment, the connection means 50 is a clear plastic pin with a female and male piece which mate through a section or opening of the fence 100. The pin 50 may be approximately a quarter inch. The openings being connection points 40 may be located approximately one inch from the top of the sides 30.

In another embodiment, the fence guard 10 may be a system that includes the fence guard 10, a cutting means 51 to cut the body and sides 30, a hole forming means 60 for forming holes 40 through the sides 30, and a fence 100 having fence posts. The cutting means 51 may be any cutting tool such as but not limited to sheers, utility knife, scissors, and blades. The length of the fence guard 10 may be determined by a user cutting the fence guard 10 with the cutting means 51 to the desired length. The fence guard 10 may be rolled into bundles for transportation. This advantageously allows for the fence guard 10 to be any desired length to fit the length of any fence 100 or to be cut to a length between fence posts. The hole forming means 60 may be used to create or form holes 40 through the sides at any desired location for connection points. The hole forming means 60 may be any punch, drill, drill bit, or drilling tool. This advantageously increases the variability of the connection means by varying the connection points to best fit the fence 100. The fence 100 may be any fence type as previously recited above. The length of the fence guard 10 and location of the connection points in the system may be created for specific fences 100 and fence posts.

The sides 30 may be approximately three to ten inches in length to substantially cover or protect the bottom of the fence 100. The sides 30 may be made of a clear plastic or polymer that is aesthetically pleasing or not easily visible while also being flexible. The sides 30 may also be green, black, brown, grey, or any fence color. This advantageously allows for the lower section of the fence to be visualized. The top edge of the sides 30 may also be approximately right angles to prevent contoured and rounded edges which reflect light. The sides 30 further are sloped to allow for water to run off to fall to the ground. The sides 30 may be coupled to the bottom 20 to form the V or U shape with an adhesive or other coupling means. Preferably, the bottom 20 may be glued to the sides 30, overlapping between a half inch to an inch and a half. The fence guard 10, when laid flat, may have a half inch to four inch gap, depending on the fence type, between the sides 30 comprising of the bottom 20. The sides 30 and bottom 20 may overlap when adhered together and may be adhered to the outside or inside surface of the sides 30. The overlap of the bottom 20 and sides 30 may be as little as a half an inch or as much as to fully overlap with the sides 30. The bottom 20 may be visually appealing and blend in with a "grassy look".

The material of the bottom 20 and sides 30 are also flexible enough to bend around a fence post. The sides 30, when bent, do not alter or discolor. The sides 30, may be scratch resistant, but pliable to be rolled up for packaging. In another embodiment, the bottom of the body further includes an aperture for inserting a fence post into and the sides 30 then wrap around opposing sides 30 of the fence post. Alternatively, a small incision may be made to the bottom 20 where the fence guard 10 will contact the post to allow for the bottom to curve outward against the post.

In another embodiment, the fence guard 10 may be a system that includes the fence guard 10, a cutting means to cut the body and sides 30, a hole forming means for forming holes 40 through the sides 30, and a fence 100 having fence posts. The cutting means may be any cutting tool such as, but not limited to, shears, utility knives, scissors, and blades. The length of the fence guard 10 may be determined by a user cutting the fence guard 10 with the cutting means to the desired length. The fence guard 10 may be rolled into bundles for transportation. This advantageously allows for the fence guard 10 to be any desired length to fit the length of any fence 100 or to be cut to a length between fence posts. The hole forming means may be used to create or form holes 40 through the sides 30 at any desired location for connection points. The hole forming means may be any punch, drill, drill bit, or drilling tool. This advantageously increases the variability of the connection means by varying the connection points to best fit the fence 100. The fence 100 may be any fence type as previously recited above. The length of the fence guard 10 and location of the connection points in the system may be created for specific fences 100 and fence posts.

In another embodiment, the fence guard 10 includes a tube or hose 42 coupled against the outer edge of both or one side 30. The tube or hose may be fluidly connected to a female threaded end or hose fitting configured to attach to a garden hose. The tube may have openings 45 to allow for fluid to pass and act as a water sprinkler. The hose 42 can withstand traditional water pressure found in a watering hose. The openings 45 may be shut to prevent unwanted watering. The hose 42 and openings 45 may be made of plastic, rubber, or a similar material.

A number of embodiments of the present invention have been described. Nevertheless, it will be understood that various modifications may be made without departing from the spirit and scope of the invention. Accordingly, other embodiments are within the scope of the following claims.

The invention claimed is:

1. A fence guard continuously extending along an entire length of a respective fence section, comprising:
    an elongated concave channel-shaped body member having a planar and horizontal bottom, the horizontal bottom of the elongated channel-shaped body member being made of a water permeable material;
    at least two planar sidewalls made of a water proof material extending upwardly from vertically bent edges of the horizontal bottom and forming an open top,
    wherein an open longitudinal channel is defined by the horizontal bottom and the planar sidewalls; the planar sidewalls are outwardly angled in a direction extending from the horizontal bottom to the open top; and the planar sidewalls are attached to outer surfaces of the opposing vertically bent end portions of the elongated concave channel-shaped body; and
    a plurality of longitudinally spaced openings along the planar sidewalls aligned respective of one another and formed to engage with each other via a connection member,
    wherein the connection member is capable of securing the planar sidewalls to one another by extending through the fence section, and the elongated channel-shaped body member is a flexible material,
    wherein the at least two planar side walls are configured to prevent damage to a cutting line of a line trimmer and further wherein the horizontal bottom of the concave channel-shaped body member is configured to prevent vegetation from growing up through the spaces of the fence, wherein the horizontal bottom is made of the water permeable material having a density that prevents vegetation growth therethrough.

2. The fence guard of claim 1, wherein the at least two planar sidewalls are made of a plastic material.

3. The fence guard of claim 1, wherein the body member is at least 2 inches in length and the at least two planar sidewalls are at least 5 inches in length.

4. The fence guard of claim 1, wherein the body member is coupled to the at least two planar sidewalls with an adhesive.

5. The fence guard of claim 1, wherein the at least two planar sidewalls are sloped to allow for water to run off.

6. The fence guard of claim 1, wherein the body member and at least two planar sidewalls are made of a material that allows for bending around a fence post.

7. The fence guard of claim 1, wherein the body member further comprises an aperture for inserting a fence post and the at least two planar sidewalls wrap around the fence post.

8. The fence guard of claim 1, wherein the plurality of spaced openings along the at least two planar sidewalls are arranged diagonally.

9. A fence guard system continuously extending along an entire length of a respective fence section, comprising:
   a fence guard comprising:
   an elongated concave channel-shaped body member having a planar and horizontal bottom, the horizontal bottom being made of a water permeable material;
   at least two-planar and upstanding sidewalls made of a water proof material extending upwardly from vertically bent edges of the horizontal bottom and forming an open top,
   wherein an open longitudinal channel is defined by the horizontal bottom and the at least two planar sidewalls; the at least two planar sidewalls are outwardly angled in a direction from the horizontal bottom to the open top; and the planar sidewalls are attached to outer surfaces of the opposing vertically bent end portions of the elongated channel-shaped body;
   a cutting device to cut the body member and sides;
   a hole forming device for forming holes through the sides, the holes being formed as a plurality of longitudinally spaced openings along the planar sidewalls aligned respective of one another;
   a connection member for connecting the sides via the plurality of longitudinally spaced openings; and
   a fence having fence posts and spaces in the fence,
   wherein the connection member connects the planar sidewalls to one another through the spaces of the fence sections,
   wherein the at least two planar side walls are configured to prevent damage to a cutting line of a line trimmer and further wherein the horizontal bottom of the concave channel-shaped body member is configured to prevent vegetation from growing up through the spaces of the fence, wherein the horizontal bottom is made of the water permeable material having a density that prevents vegetation growth therethrough.

10. The fence guard system of claim 9, wherein the elongated channel-shaped body member is a flexible material that is cut to a desired length with the cutting device.

11. The fence guard system of claim 9, wherein the body member is formed around the fence.

12. The fence guard system of claim 9, wherein the at least two planar sidewalls are mad of a plastic material and the fence is visible while the sides are secured.

13. The fence guard system of claim 9, wherein the body member is at least a length of the horizontal bottom of the fence and the at least two planar sidewalls are at least 5 inches in length.

14. The fence guard of claim 9, wherein the at least two planar sidewalls are sloped to allow for water to run off.

15. The fence guard system of claim 9, wherein the body member further comprises an aperture for inserting the fence posts and the side wrap around the fence posts.

16. A fence guard continuously extending along an entire length of a respective fence section, comprising:
   an elongated channel-shaped body member having a concave shaped bottom, a center of the concave shaped bottom being planar and horizontal, the concaved shaped bottom being made of a water permeable material;
   at least two planar and upstanding sidewalls extending upwardly from vertically bent edges of the body member and forming an open top coupled to the body member,
   wherein an open longitudinal channel is defined by the bottom and the at least two planar sidewalls; the at least two planar sidewalls are made of a clear, water proof material and outwardly angled in a direction from the bottom to the open top; and the planar sidewalls are attached to outer surfaces of the opposing vertically bent end portions of the elongated concave channel-shaped body; and
   each planar sidewall having a plurality of longitudinally spaced openings along the planar sidewalls aligned respective of one another and formed to engage with each other via a connection member to couple the planar sidewalls,
   wherein the connection member extends through openings of the fence section to secure the planar sidewalls against the fence section, and the elongated channel-shaped body member is a flexible material,
   wherein the at least two planar side walls are configured to prevent damage to a cutting line of a line trimmer and further wherein the horizontal bottom of the concave channel-shaped body member is configured to prevent vegetation from growing up through the spaces of the fence, wherein the horizontal bottom is made of the water permeable material having a density that prevents vegetation growth therethrough.

17. The fence guard of claim 16, wherein the plurality of longitudinally space openings along the at least two planar sidewalls are aligned diagonally and respective of one another and formed to engage with each other via a connection member to couple the at least two planar sidewalls at differing heights.

* * * * *